United States Patent [19]

Ando et al.

[11] Patent Number: 4,866,016
[45] Date of Patent: Sep. 12, 1989

[54] ALUMINA-BASED CERAMIC COMPOSITION

[75] Inventors: Minato Ando, Aichi; Masaaki Ito, Nagoya; Fumio Mizuno, Nagoya, all of Japan

[73] Assignee: NGK Spark Plug Co., Ltd., Aichi, Japan

[21] Appl. No.: 98,349

[22] Filed: Sep. 18, 1987

[30] Foreign Application Priority Data

Sep. 18, 1986 [JP] Japan .................... 61-220274

[51] Int. Cl.$^4$ ................ C04B 35/10; C04B 35/46
[52] U.S. Cl. ........................... 501/134; 501/153
[58] Field of Search .................... 501/134, 153

[56] References Cited

U.S. PATENT DOCUMENTS

| 4,614,725 | 9/1986 | Ando | 501/153 |
| 4,643,985 | 2/1987 | Ando | 501/153 |
| 4,668,646 | 5/1987 | Ando | 501/153 |

Primary Examiner—Mark L. Bell
Attorney, Agent, or Firm—Wegner & Bretschneider

[57] ABSTRACT

A sintered alumina-based ceramic body exhibiting excellent electrical characteristics, in particular, excellent dielectric power factor and a temperature coefficient of a resonant frequency, which consists essentially of 0.01 to 7 parts by weight of $Ta_2O_5$ admixed with 100 parts by weight of an expanded $Al_2O_3$—$SnO_2$—$TiO_2$ ternary base composition (by molar fraction) of:

| $Al_2O_3$ | $SnO_2$ | $TiO_2$ |
|---|---|---|
| 0.925 | 0.055 | 0.020 |
| 0.625 | 0.285 | 0.090 |
| 0.625 | 0.0245 | 0.3505 |
| 0.925 | 0.010 | 0.065 |

Dielectric power factor tan $\delta$ of $10 \times 10^{-5}$ or below and temperature coefficient (Tf) of the resonance frequency from $-28$ to $+14$ ppm/° C. Tf=0 is achieved at a preferred range.

An alumina-based ceramic sintered body having a compositional range within a triangular range defined by sequentially connecting the points P, Q and R in the following compositional table of the $Al_2O_3$—$SnO_2$—$TiO_2$ ternary system, expressed in terms of the molar fraction:

|   | $Al_2O_3$ | $SnO_2$ | $TiO_2$ |
|---|---|---|---|
| P | 0.95 | 0.025 | 0.025 |
| Q | 0.70 | 0.225 | 0.075 |
| R | 0.70 | 0.075 | 0.225 | can provide the same dielectric power factor but with a temperature coefficient $\tau_\epsilon$ of the dielectric constant from $-40$ to $+40$ ppm/° C. within 1 MHz to 7 GHz.

11 Claims, 2 Drawing Sheets

ALUMINA-BASED CERAMIC COMPOSITION

BACKGROUND

This invention relates to an alumina-based ceramic composition suitable for use in the field of electric communication such as microwave dielectric resonators, microwave-guide circuits or lines, microwave capacitor, microwave integrated circuit substrate, and so on; or in the field of high energy physics such as microwave transmitting window for nuclear fusion apparatus, and so forth.

In recent years, with development in the communication networks, the range of frequency used has been expanded to that of the microwaves. In connection with this, dielectric ceramics are widely employed in the region of the microwave frequencies, for impedance matching in various microwave circuits, beginning with the dielectric resonators, and others.

Most recently, a large number of dielectric ceramic elements are required as filters, guns, or frequency stabilizers for FET microwave osicators and the need is still increasing. The size of the microwave circuit is determined based on the wavelength of the electromagnetic wave. Its wavelength is defined as $\lambda o/\epsilon$ where $\lambda o$ is the wave length in vacuum and $\epsilon$ is specific dielectric constant when the microwave is transmitted within the three-dimensional microwave circuit made of a dilectric material. On the other hand alumina ceramics have been known to have a high mechanical strength and a low dielectric loss, and to be of a low cost.

Therefore, as this kind of the dielectric ceramics, much attention has been drawn to alumina ceramics.

SUMMARY OF THE DISCLOSURE

However, since the conventional alumina ceramics have a large value of the temperature coefficient $\tau_\epsilon$ of the dielectric constant amounting to about $+110$ ppm/°C., its utility has been very limited.

Accordingly, it is a primary object of the present invention to provide a new type of alumina-based ceramics which can eliminate said drawback.

And, for this purpose, according to a first aspect of the present invention there is proposed a composition composed of $Al_2O_3$—$SnO_2$—$TiO_2$, each component having its compositional range within a triangular range defined by sequentially connecting the points P, Q and R in the following compositional table of the $Al_2O_3$—$SnO_2$—$TiO_2$ ternary system, expressed in terms of the molar fraction:

|   | $Al_2O_3$ | $SnO_2$ | $TiO_2$ |
| --- | --- | --- | --- |
| P | 0.95 | 0.025 | 0.025 |
| Q | 0.70 | 0.225 | 0.075 |
| R | 0.70 | 0.075 | 0.225 |

(Note: The first aspect was originally proposed by the present inventors in Japanese Patent Application No. 60-260777 which is now Japanese Patent Kokai-Publication No. 62-119157 published on May 30, 1987).

The triangular range P-Q-R is shown in FIGS. 1 and 2. This composition can provide alumina-based ceramics having a dielectric power (loss) factor tan $\delta$ of $10 \times 10^{-5}$ or below and a temperature coefficient of the dielectric constant $\tau_\epsilon$ of $-40$ to $+40$ ppm/°C. within a high frequency range of 1 MHz to 7 GHz.

It is a further object of the present invention to provide an improved alumina-based ceramic composition and sintered body, in which the base (P-Q-R) compositional range of the $Al_2O_3$—$SnO_2$—$TiO_2$ ternary system is further expanded.

According to the present invention in a second aspect thereof, there is provided an alumina-based ceramic composition, exhibiting excellent electrical characteristics, in particular, excellent dielectric power factor (tan $\delta$) and a temperature coefficient (Tf) of resonance frequency, in which 0.01 to 7 parts by weight of $Ta_2O_5$ is admixed with 100 parts by weight of a ternary composition consisting of $Al_2O_3$, $SnO_2$ and $TiO_2$, thereby expanding the compositional range of said $Al_2O_3$—$SnO_2$—$TiO_2$ composition to that enclosed in a quadrilateral zone defined by sequentially connecting the points 1, 2, 3 and 4 in the following compositional table of the $Al_2O_3$—$SnO_2$—$TiO_2$ ternary system as shown in FIG. 1, by molar fraction:

|   | $Al_2O_3$ | $SnO_2$ | $TiO_2$ |
| --- | --- | --- | --- |
| Point 1 | 0.925 | 0.055 | 0.020 |
| Point 2 | 0.625 | 0.285 | 0.090 |
| Point 3 | 0.625 | 0.0245 | 0.3505 |
| Point 4 | 0.925 | 0.010 | 0.0650. |

In this range an improved temperature coefficient (Tf) ranging from $-$ to $+14$ ppm/°C. is achieved, and the dielectric power factor (tan $\delta$) is $10 \times 10^{-5}$ or below.

The foregoing object, other objects as well as specific compositional range of the alumina ceramic composition and the process for manufacturing the same will become more apparent and understandable from the following detailed description thereof when read in conjunction with a preferred example to put the present invention into practice along with the accompanying drawing.

BRIEF DESCRIPTION OF THE ACCOMPANYING DRAWING

DETAILED DESCRIPTION OF PREFERRED EMBODIMENT

Figure 1:
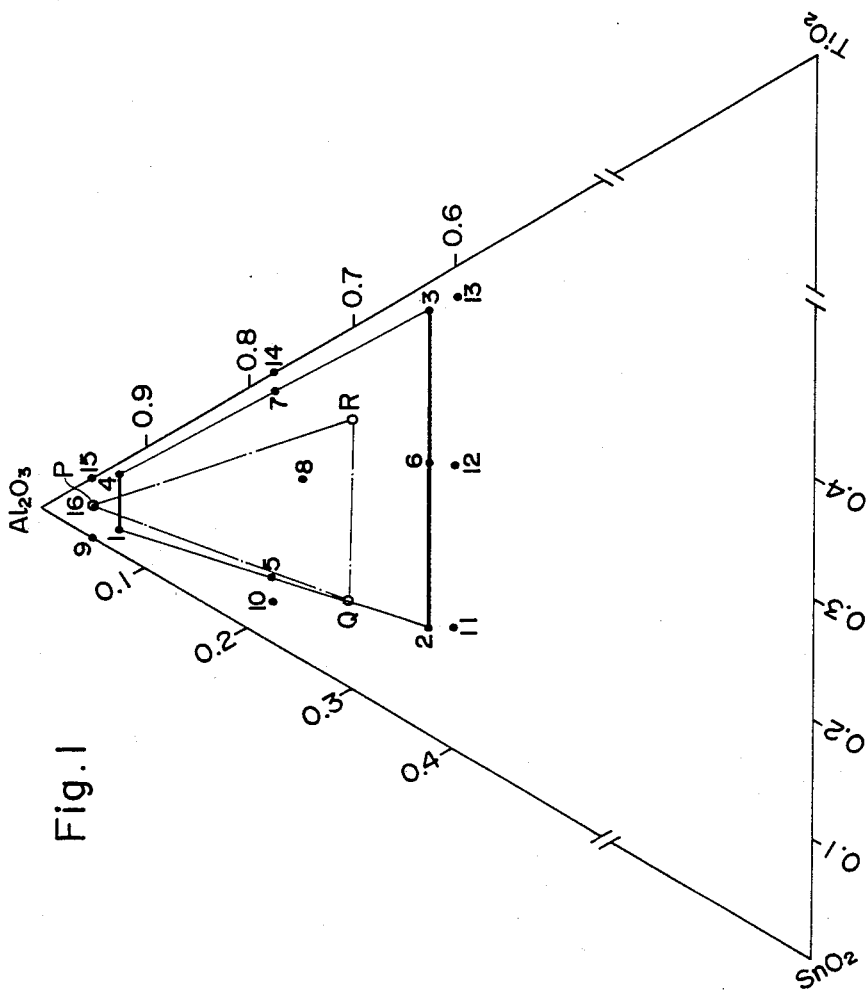
FIG. 1 is an $Al_2O_3$—$SnO_2$—$TiO_2$ ternary compositional diagram to be the base for the alumina ceramic composition according to the present invention. A zone defined by 1-2-3-4 points represents an embodiment of the second aspect of the invention.

According to a first aspect of the present invention, the P-Q-R zone provides a practical alumina ceramic material widely applicable in the electric communication at high frequency. As an area where $Al_2O_3$ is present in excess beyond the P-Q-R zone, the temperature coefficient $\tau_\epsilon$ of the dielectric constant exceeds the upper limit value $+40$ ppm/°C., whereas at an area with $Al_2O_3$ below the P-Q-R zone, $\tau_\epsilon$ becomes below the lower limit value $-40$ ppm/°C. and the dielectric power factor tan $\delta$ exceeds the upper limit of $10 \times 10^{-5}$. Even at the defined $Al_2O_3$ range, the dielectric power factor exceeds the limit when $SnO_2$ and/or $TiO_2$ are outside the P-Q-R zone.

Second Aspect

By its addition in a very small quantity, $Ta_2O_5$ would remarkably improve the dielectric power factor (tan $\delta$)

as shown in Table 1 below, and expand the range wherein the dielectric power factor is substantially equal to tan $\delta = 10 \times 10^{-5}$ or below as disclosed in the abovementioned Japanese Patent Application No. 60-260777 to a range to be defined by connecting the points 1, 2, 3 and 4. 0.01 parts by weight provides a minimum amount showing effect of the presence of $Ta_2O_5$. In particular, it exhibits a maximum effect with its quantity of 2 parts by weight. However, when it exceeds 5 parts by weight the dielectric power factor tends to increase abruptly. Thus a prefered amount is at 0.01 to 5 parts by weight of $Ta_2O_5$. Also, the temperature coefficient of the resonance frequency (Tf) falls within a range from −28 to +14 ppm/°C. A particularly excellent value of Tf=0 was indicated with $Ta_2O_5$ in a range of from 0.5 to 2 parts by weight, in the case with specimen No. 8 (8a to 8e) which is located approximately at the central position among various specimens having the $Al_2O_3$—$SnO_2$—$TiO_2$ type composition as the principal constituent. A $Ta_2O_5$ amount of 1.5 to 2.5 parts by weight is preferred corresponding to the Tf value of −15 to +8 ppm/°C. By the way, the specimens No. 9 (ia, 9b) to No. 16 (16a, 16b) in Table 1 below indicate that, even if $Ta_2O_5$ is added, no satisfactory result can be obtained, if and when the $Al_2O_3$—$SnO_2$—$TiO_2$ type composition is out of the range as defined by the present invention.

With the adding quantity of $Ta_2O_5$ being 0.01 to 7 parts by weight or below with respect to 100 parts by weight of $Al_2O_3$—$SnO_2$—$TiO_2$ type composition, it becomes possible to expand the range of the above-mentioned $Al_2O_3$—$SnO_2$—$TiO_2$ base composition to about 2.5 times as broad as that of the abovementioned P-Q-R zone without $Ta_2O_5$, whereby mass-productivity can be increased and a range of selection of the composition for an objective product can be expanded.

Generally, the sintering may be carried out at a temperature ranging from 1410° to 1540° C., preferably 1430° to 1500° C. Preferably, the resultant sintered body has an average crystal grain size of 2 to 5 μm (more preferably 3 to 4 μm).

The effect of $Ta_2O_5$ addition is believed to be attributable to the followings. Generally, the ion radius of Ta ion stands relatively close to Ti and Sn ($Ta^{5+}$ =0.64 Å, $Ti^{4+}$ =0.61 Å, $Sn^{4+}$ 0.69 Å, $Al^{3+}$ =0.53 Å), thus has a possibility to form a solid solution with oxide of Ti or Sn. On the other hand, the dielectric power factor tan δ is generally defined by the following factors:
 (i) loss due to ion-migration in the ceramics
    (a) direct current loss,
    (b) loss due to ion jumping or dipole polarization,
 (ii) loss due to oscillation or deformation of ions, and
 (iii) loss due to electron polarization.

Within a range at a frequency of about 10 GHz, the effect (i) becomes minor while the effect (ii) becomes major. The effect (ii) is the major factor in a range from 10 to 1000 GHz, too.

The improvement by the $Ta_2O_5$ addition and/or expansion of the basic $Al_2O_3$—$SnO_2$—$TiO_2$ compositional range is believed to be atributable to the solid solution formation in systems $Ta_2O_5$—$TiO_2$, $Ta_2O_5$—$SnO_2$, and $Ta_2O_5$—$TiO_2$—$SnO_2$, whereby the negative factors (i)(b) and/or (ii) are prohibited. The solid solution formation of Ta with a high atomic number will form vacancy of Ti for $TiO_2$ or Sn for $SnO_2$, whereby, to our belief, dipole polarization is reduced and ion oscillation is prohibited.

With a view to enabling those persons skilled in the art to practice the present invention, the following preferred example is presented. It should be noted however that the invention is not limited to this example alone, but any changes and modifications may be made within the gist and swpe of the invention as disclosed herein and defined in the appended claim.

EXAMPLE

Example 1

(Second Aspect)

The following three ingredients were blended to be 300 g in total and to show their respective molar ratio at each point of the ternary compositional diagram as plotted in the sole FIGURE of the accompanying drawing:

| | |
|---|---|
| $Al_2O_3$ | (having 99.995% of purity and being available in general commercial market) |
| $SnO_2$ | (reagent of special grade) |
| $TiO_2$ | (reagent of special grade). |

With these ingredients as the principal component, there was admixed thereto $Ta_2O_5$ (reagent of the special grade) as an auxiliary component at its mixing ratio to each specimen shown in Table 1 (this also includes a case where none is added), with simultaneous addition of the following:

| | |
|---|---|
| Polyvinyl alcohol | 3 g |
| Water | 200 ml. |

Then, each of the mixtures in Table 1, as the starting material, was placed in a ball mill of polyethylene having an inner capacity of 1 liter, together with 1 kg of alumina ceramic balls (having 99.99% of purity) having 15 mm in diameter, to conduct wet-milling mixing for 72 hours at a speed of 120 rpm. The resulted slurry was dried, after which the dried slurry was screened through a 32-mesh sieve, thereby obtaining material powder.

This material powder was then shaped in a rod of 8 mm in diameter and 8 mm in length in a metal press mold under a pressure of 1,500 kgf/cm². After drying the shaped body, it was sintered in the atmosphere.

Subsequently, the sintered products were subjected to polishing to a mirror-surface to a size of 6 mm in diameter and 6 mm in length, after which they were washed in acetone and deionized water, respectively, for ten minutes each under application of ultrasonic wave, and then allowed to natural drying. Finally, the products were left to stand for 15 minutes in a desiccator together with silica gel, which served as the test samples.

Conditions for Measurements

Tan δ and ε in the microwave band were measured by the use of the dielectric column resonator method. The resonant frequency was about 13 GHz. Tf was also measured in a range from −20° C. to +80° C. The preferred density of the sintered products ranges from 3.92 to 3.95 g/cm³, approximately.

Table 2 shows the density and crystal grain size of the sintered products produced in the same manner as mentioned above.

TABLE 1-1

| Samples No. | Composition Main Components Al$_2$O$_3$ molar % | SnO$_2$ molar % | TiO$_2$ molar % | Sum wt parts | Sub-component Ta$_2$O$_5$ wt parts | Properties tan δ × 10$^{-5}$ | ε | Tf ppm/°C. | Sintering Temp. °C. | Remarks |
|---|---|---|---|---|---|---|---|---|---|---|
| 1a | 92.5 | 5.5 | 2.0 | 100 | 0 | 25 | 10.0 | −26 | 1450 | B |
| 1b | | | | | 0.01 | 9 | 10.0 | −26 | 1450 | A |
| 1c | | | | | 0.5 | 7 | 10.2 | −27 | 1470 | |
| 1d | | | | | 2.0 | 5 | 10.4 | −28 | 1490 | |
| 1e | | | | | 5.0 | 9 | 10.8 | −29 | 1510 | |
| 1f | | | | | 7.0 | 14 | 11.0 | −30 | 1520 | B |
| 2a | 62.5 | 28.5 | 9.0 | 100 | 0 | 26 | 15.0 | 14 | 1420 | B |
| 2b | | | | | 0.01 | 10 | 15.0 | 14 | 1420 | A |
| 2c | | | | | 0.5 | 8 | 15.1 | 12 | 1430 | |
| 2d | | | | | 2.0 | 5 | 15.4 | 10 | 1440 | |
| 2e | | | | | 5.0 | 9 | 15.9 | 8 | 1450 | |
| 2f | | | | | 7.0 | 16 | 16.0 | 6 | 1460 | B |
| 3a | 62.5 | 2.45 | 35.05 | 100 | 0 | 20 | 16.1 | 14 | 1430 | B |
| 3b | | | | | 0.01 | 8 | 16.1 | 14 | 1430 | A |
| 3c | | | | | 0.5 | 7 | 16.3 | 12 | 1440 | |
| 3d | | | | | 2.0 | 6 | 16.7 | 9 | 1460 | |
| 3e | | | | | 5.0 | 8 | 17.0 | 7 | 1470 | |
| 3f | | | | | 7.0 | 14 | 17.3 | 4 | 1470 | B |
| 4a | 92.5 | 1.0 | 6.5 | 100 | 0 | 23 | 10.8 | 5 | 1450 | B |
| 4b | | | | | 0.01 | 11 | 10.8 | 5 | 1450 | A |
| 4c | | | | | 0.5 | 6 | 11.0 | 3 | 1460 | |
| 4d | | | | | 2.0 | 4 | 11.4 | 1 | 1480 | |
| 4e | | | | | 5.0 | 7 | 11.8 | 0 | 1500 | |
| 4f | | | | | 7.0 | 15 | 12.1 | −2 | 1510 | B |

A: within the claimed scope
B: outside the claimed scope

TABLE 1-2

| Samples No. | Composition Main Components Al$_2$O$_3$ molar % | SnO$_2$ molar % | TiO$_2$ molar % | Sum wt parts | Sub-component Ta$_2$O$_5$ wt parts | Properties tan δ × 10$^{-5}$ | ε | Tf ppm/°C. | Sintering Temp. °C. | Remarks |
|---|---|---|---|---|---|---|---|---|---|---|
| 5a | 77.5 | 17.0 | 5.5 | 100 | 0 | 23 | 12.1 | −5 | 1470 | B |
| 5b | | | | | 0.01 | 10 | 12.5 | −3 | 1440 | |
| 5c | | | | | 2.0 | 10 | 12.7 | −6 | 1450 | A |
| 5d | | | | | 5.0 | 5 | 12.7 | −9 | 1470 | |
| 5e | | | | | 7.0 | 15 | 13.4 | −11 | 1480 | B |
| 6a | 62.5 | 15.0 | 22.5 | 100 | 0 | 23 | 15.7 | 17 | 1410 | B |
| 6b | | | | | 0.01 | 9 | 15.6 | 14 | 1430 | |
| 6c | | | | | 2.0 | 6 | 15.7 | 12 | 1440 | A |
| 6d | | | | | 5.0 | 7 | 16.1 | 10 | 1450 | |
| 6e | | | | | 7.0 | 15 | 16.5 | 8 | 1460 | B |
| 7a | 77.5 | 1.5 | 21.0 | 100 | 0 | 22 | 13.2 | 6 | 1430 | B |
| 7b | | | | | 0.01 | 10 | 13.5 | 9 | 1440 | |
| 7c | | | | | 2.0 | 7 | 13.7 | 8 | 1450 | A |
| 7d | | | | | 5.0 | 10 | 14.1 | 5 | 1470 | |
| 7e | | | | | 7.0 | 18 | 14.4 | 4 | 1490 | B |
| 8a | 75.0 | 10.0 | 15.0 | 100 | 0 | 22 | 12.7 | 2 | 1450 | B |
| 8b | | | | | 0.01 | 9 | 12.7 | 2 | 1450 | |
| 8c | | | | | 0.05 | 7 | 12.7 | 2 | 1450 | |
| 8d | | | | | 0.5 | 5 | 12.9 | 0 | 1460 | A |
| 8e | | | | | 2.0 | 3 | 13.2 | 0 | 1480 | |
| 8f | | | | | 5.0 | 8 | 13.6 | −3 | 1500 | |
| 8g | | | | | 7.0 | 16 | 13.8 | −10 | 1510 | B |
| 9a | 95.0 | 5.0 | 0 | 100 | 0 | 15 | 9.9 | −32 | 1520 | B |
| 9b | | | | | 2.0 | 12 | 10.2 | −36 | 1540 | |

A: within the claimed scope
B: outside the claimed scope

TABLE 1-3

| Samples No. | Composition Main Components Al$_2$O$_3$ molar % | SnO$_2$ molar % | TiO$_2$ molar % | Sum wt parts | Sub-component Ta$_2$O$_5$ wt parts | Properties tan δ × 10$^{-5}$ | ε | Tf ppm/°C. | Sintering Temp. °C. | Remarks |
|---|---|---|---|---|---|---|---|---|---|---|
| 10a | 77.5 | 19.0 | 3.5 | 100 | 0 | 27 | 12.7 | 0 | 1480 | B |
| 10b | | | | | 2.0 | 18 | 13.0 | −3 | 1510 | |
| 11a | 60.0 | 30.0 | 10.0 | 100 | 0 | 30 | 15.8 | 18 | 1440 | " |
| 11b | | | | | 2.0 | 14 | 16.0 | 13 | 1470 | |
| 12a | 60.0 | 16.5 | 23.5 | 100 | 0 | 28 | 16.2 | 19 | 1430 | " |

TABLE 1-3-continued

|  | Composition | | | | | Properties | | | Sintering | |
|---|---|---|---|---|---|---|---|---|---|---|
|  | Main Components | | | | Sub-component | | | | | |
| Samples No. | Al$_2$O$_3$ | SnO$_2$ | TiO$_2$ | Sum wt parts | Ta$_2$O$_5$ wt parts | tan δ × 10$^{-5}$ | ε | Tf ppm/°C. | Temp. °C. | Remarks |
|  | molar % | | | | | | | | | |
| 12b |  |  |  |  | 2.0 | 15 | 16.6 | 19 | 1460 |  |
| 13a | 60.0 | 2.5 | 37.5 | 100 | 0 | 28 | 16.6 | 17 | 1410 | " |
| 13b |  |  |  |  | 2.0 | 13 | 16.8 | 13 | 1450 |  |
| 14a | 77.5 | 0 | 22.5 | 100 | 0 | 26 | 13.8 | 7 | 1430 |  |
| 14b |  |  |  |  | 2.0 | 14 | 14.2 | 4 | 1460 |  |
| 15a | 95.0 | 0 | 5.0 | 100 | 0 | 22 | 10.0 | −25 | 1440 | " |
| 15b |  |  |  |  | 2.0 | 16 | 10.3 | −28 | 1460 |  |
| 16a | 95.0 | 2.5 | 2.5 | 100 | 0 | 12 | 10.0 | −33 | 1450 | " |
| 16b |  |  |  |  | 2.0 | 13 | 10.6 | −36 | 1470 |  |

A: within the claimed scope
B: outside the claimed scope

TABLE 2

| Al$_2$O$_3$ | SnO$_2$ | TrO$_2$ | Ta$_2$O$_5$ (wt parts) | Tf (ppm/°C.) | density | crystal grain size (μm) |
|---|---|---|---|---|---|---|
| 92.5 | 1.0 | 6.5 | 0 | 5 | 3.92 | 4.5 |
|  |  |  | 0.5 | 3 | 3.92 | 4 |
| (molar %) | | | 1 | 2 | 3.93 | 4 |
|  |  |  | 1.5 | 1.5 | 3.93 | 3.5 |
|  |  |  | 2 | 1 | 3.94 | 3 |
|  |  |  | 2.5 | 0.8 | 3.94 | 3 |
|  |  |  | 3 | 0.6 | 3.95 | 3.5 |
|  |  |  | 5 | 0 | 3.94 | 5 |
|  |  |  | 7 | −2 | 3.91 |  |

Example 2

Figure 2:
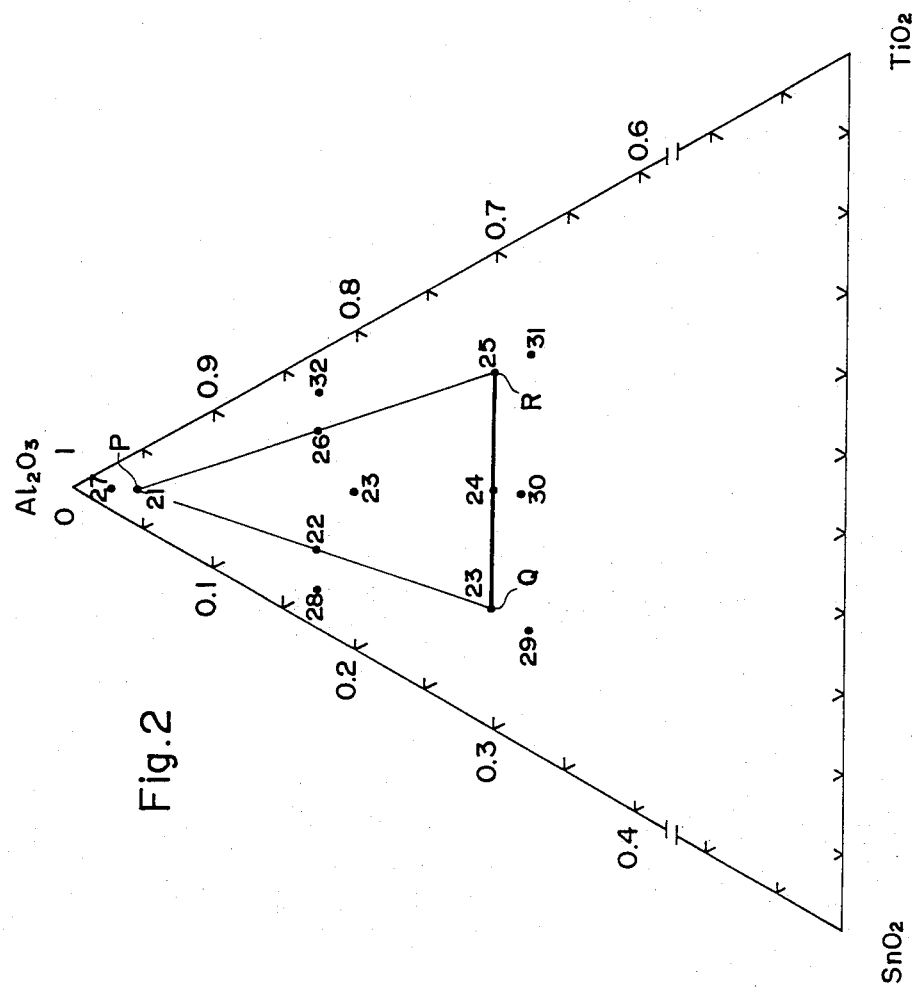
FIG. 2 is a ternary compositional diagram like FIG. 1 wherein a zone defined by P-Q-R points represents the zone according to an embodiment of the first aspect of the invention.

Starting material mixtures having compositions as shown in Table 3 at samples Nos. 21-33 locating outside and inside the P-Q-R triangular zone of the Al$_2$O$_3$—SnO$_2$—TiO$_2$ triangular ternary system diagram as shown in FIG. 2 were prepared by using an alumina powder having an average particle size of 0.5 μm and a purity of 99.995%, and SnO$_2$ and TiO$_2$ of reagents of the special grade. A 300 g fraction of each mixture, 200 g deionized water and 3 g polyvinyl alcohol were admixed and wet milled for 48 hours like in Example 1 followed by freeze-drying and passing through a 42 mesh sieve resulting in a mixture powder, respectively. Each of the resultant powders was compacted in a metal mold at a pressure of 1500 kgf/cm$^2$ and sintered at each temperature shown in Table 3. The sintered bodies were subjected to polishing to finished products with a size of 15 mm in diameter and 8 mm in length. The products were ultrasonically cleaned for each 20 minutes in 1-1-1 trichloro-etane and deionized water, respectively, followed by natural drying and then the products were dried in a desiccator for 15 hours. The resultant dried products were measured for the dielectric properties through the dielectric column resonator method under the conditions:
Apparatus = type 8410C Yokogawa Hewlett-Packard Network Analizer System
Frequency = at 7 GHz.

TABLE 3

| No. | composition molar fraction | | | ε | tan δ [× 10$^{-5}$] | τ$_ε$ [ppm/°C.] | sintering temp. [°C.] | Remarks |
|---|---|---|---|---|---|---|---|---|
|  | Al$_2$O$_3$ | SnO$_2$ | TiO$_2$ |  |  |  |  |  |
| 21 | 0.95 | 0.025 | 0.025 | 9.9 | 60 × 10$^{-5}$ | +40 | 1460 | A |
| 22 | 0.825 | 0.125 | 0.05 | 11.7 | 7.9 | +82 | 1440 | ' |
| 23 | 0.70 | 0.225 | 0.075 | 14.2 | 9.7 | −40 | 1410 | ' |
| 24 | 0.70 | 0.15 | 0.15 | 14.5 | 9.5 | −39 | 1400 | ' |
| 25 | 0.70 | 0.075 | 0.225 | 14.7 | 9.5 | −38 | 1380 | ' |
| 26 | 0.825 | 0.05 | 0.125 | 11.9 | 7.6 | +26 | 1430 | ' |
| 27 | 0.97 | 0.015 | 0.015 | 9.8 | 5.5 | +56 | 1490 | B |
| 28 | 0.825 | 0.15 | 0.025 | 11.6 | 10.9 | +30 | 1460 | ' |
| 29 | 0.675 | 0.25 | 0.075 | 14.9 | 12.3 | −52 | 1390 | ' |
| 30 | 0.68 | 0.16 | 0.16 | 15.1 | 11.9 | −49 | 1380 | ' |
| 31 | 0.675 | 0.075 | 0.25 | 15.5 | 12.1 | −46 | 1360 | ' |
| 32 | 0.825 | 0.025 | 0.15 | 12.1 | 11.8 | +31 | 1420 | ' |
| 33 | 0.80 | 0.10 | 0.10 | 13.0 | 6.1 | −1 | 1420 | A |

A: within the claimed scope
B: outside the claimed scope

What is claimed is:
1. An alumina-based ceramic composition which consists essentially of:
an Al$_2$O$_3$—SnO$_2$—TiO$_2$ base composition, each of said components having its compositional range as plotted in a quadrilateral zone defined by sequentially connecting points 1, 2, 3 and 4 in a Al$_2$O$_3$—SnO$_2$—TiO$_2$ ternary compositional system, expressed in terms of the following molar fractions:

|  | Al$_2$O$_3$ | SnO$_2$ | TiO$_2$ |
|---|---|---|---|
| Point 1 | 0.925 | 0.055 | 0.020 |
| Point 2 | 0.625 | 0.285 | 0.090 |
| Point 3 | 0.625 | 0.0245 | 0.3505 |
| Point 4 | 0.925 | 0.010 | 0.065; and |

Ta$_2$O$_5$ being admixed at a rate of 0.01-7 parts by weight with respect to 100 parts by weight of said Al$_2$O$_3$—SnO$_2$—TiO$_2$ composition.

2. An alumina-based ceramic sintered body which has been produced by sintering said composition as defined in claim 1.

3. An alumina-based ceramic sintered body as defined in claim 2, wherein $Ta_2O_5$ is present 0.01 to 5.0 parts by weight with respect to 100 parts by weight of the $Al_2O_3$—$SnO_2$—$TiO_2$ composition.

4. An alumina-based ceramic sintered body as defined in claim 2, wherein $Ta_2O_5$ is present in an amount of 1.5 to 2.5 parts by weight with respect to 100 parts by weight of the $Al_2O_3$—$SnO_2$—$TiO_2$ composition.

5. An alumina-based ceramic sintered body as defined in claim 3, wherein $Ta_2O_5$ is present 0.5 to 2.0 parts by weight.

6. An alumina-based ceramic sintered body as defined in claim 5, wherein Tf is about zero.

7. An alumina-based ceramic sintered body as defined in claim 2, wherein Tf is $-15$ to $+8$ ppm/°C.

8. An alumina-based ceramic sintered body as defined in claim 2, wherein the dielectric power factor is $10 \times 10^{-5}$ or below.

9. An alumina-based ceramic sintered body consisting essentially of components within within a triangular range defined by sequentially connecting the points P, Q and R in the following compositional table of the $Al_2O_3$—$SnO_2$—$TiO_2$ ternary system, expressed in terms of molar fraction:

|   | $Al_2O_3$ | $SnO_2$ | $TiO_2$ |
|---|---|---|---|
| P | 0.95 | 0.025 | 0.025 |
| Q | 0.70 | 0.225 | 0.075 |
| R | 0.70 | 0.075 | 0.225. |

10. An alumina-based ceramic sintered body as defined in claim 9 having a dielectric power factor tan δ of $10 \times 10^{-5}$ or below.

11. An alumina-based ceramic sintered body as defined in claim 9 having a temperature coefficient $\tau_\epsilon$ of the dielectric constant from $-40$ to $+40$ ppm/°C. within 1 MHz to 7 GHz.

* * * * *